US012573627B2

(12) United States Patent
    Barboux et al.

(10) Patent No.: US 12,573,627 B2
(45) Date of Patent: Mar. 10, 2026

(54) IRON SODIUM HYDROXYSULPHIDE COMPOUND, PROCESS FOR PREPARING SUCH A COMPOUND, ACTIVE MATERIAL COMPRISING SUCH A COMPOUND AND ELECTROCHEMICAL ELECTRODE PRODUCED OF SUCH AN ACTIVE MATERIAL

(71) Applicants: AMPERE S.A.S., Boulogne Billancourt (FR); CENTRE NATIONAL DE LA RECHERCHE SCIENTIFIQUE (CNRS), Paris (FR); Ecole Nationale Supérieure de Chimie de Paris, Paris (FR)

(72) Inventors: Philippe Barboux, L'hay les Roses (FR); Mohamed Chakir, Guyancourt (FR); Domitille Giaume, Paris (FR); Ine Haugland-Gosling, Aberdeen (GB); Caroline Mir, Paris (FR)

(73) Assignees: AMPERE S.A.S., Boulogne Billancourt (FR); CENTRE NATIONAL DE LA RECHERCHE SCIENTIFIQUE (CNRS), Paris (FR); Ecole Nationale Supérieure de Chimie de Paris, Paris (FR)

( * ) Notice: Subject to any disclaimer, the term of this patent is extended or adjusted under 35 U.S.C. 154(b) by 0 days.

(21) Appl. No.: 18/696,538

(22) PCT Filed: Sep. 21, 2022

(86) PCT No.: PCT/FR2022/051771
    § 371 (c)(1),
    (2) Date: Mar. 28, 2024

(87) PCT Pub. No.: WO2023/052706
    PCT Pub. Date: Apr. 6, 2023

(65) Prior Publication Data
    US 2025/0006915 A1    Jan. 2, 2025

(30) Foreign Application Priority Data

Sep. 30, 2021    (FR) ...................................... 2110363

(51) Int. Cl.
    *H01B 1/10*        (2006.01)
    *C01G 49/00*       (2006.01)
    (Continued)

(52) U.S. Cl.
    CPC .......... *H01M 4/525* (2013.01); *C01G 49/009* (2013.01); *H01B 1/10* (2013.01); *H01M 4/131* (2013.01);
    (Continued)

(58) Field of Classification Search
    CPC .. H01B 1/00; H01B 1/06; H01B 1/10; H01M 4/52; H01M 4/525; C01G 49/00
    See application file for complete search history.

(56) References Cited

U.S. PATENT DOCUMENTS 11,431,030 B2 *    8/2022    Shimizu .............. H01M 10/058

FOREIGN PATENT DOCUMENTS

FR          3 090 213 A1      6/2020
WO      WO-2017048341 A1 *    3/2017    .......... H01M 10/054

OTHER PUBLICATIONS

Yao et al "Metal-organic framework derived flower-like FeS/C composite as an anode material in lithium-ion and sodium-ion batteries", ournal of Alloys and Compounds 790 (2019) 288-295.*
(Continued)

*Primary Examiner* — Mark Kopec
(74) *Attorney, Agent, or Firm* — Oblon, McClelland, Maier & Neustadt, L.L.P.

(57) ABSTRACT

A process for preparing a compound of formula $(NaOH)_x$ $[Fe(OH)_2]_y FeS$, may include: (a) mixing iron and sodium sulfide in equimolar amounts, in an NaOH aqueous solution;
(Continued)

(b) heating the obtained mixture up to a temperature in a range of from 110 to 210° C. for a duration in a range of from 1 hour to 1 week; and (c) recovering the active material by filtering and drying in a neutral atmosphere.

11 Claims, 3 Drawing Sheets

(51) Int. Cl.

| | |
|---|---|
| *H01M 4/131* | (2010.01) |
| *H01M 4/52* | (2010.01) |
| *H01M 4/525* | (2010.01) |
| *H01M 4/62* | (2006.01) |
| *H01M 10/054* | (2010.01) |
| *H01M 4/02* | (2006.01) |

(52) U.S. Cl.
CPC ......... *H01M 4/625* (2013.01); *H01M 10/054* (2013.01); *C01P 2002/50* (2013.01); *C01P 2006/40* (2013.01); *H01M 2004/027* (2013.01)

(56) References Cited

OTHER PUBLICATIONS

Bu et al "Rational design of three-dimensional graphene encapsulated core-shell FeS@carbon nanocomposite as a flexible high-performance anode for sodium-ion batteries", J. Mater. Chem. A, 2018, 6, 6414.*

International Search Report mailed on Dec. 13, 2022 in PCT/FR2022/051771 filed on Sep. 21, 2022, 17 pages (with English Translation).

Xiuquan Zhou et al. "Superconductivity in Iron Sulfides Intercalated by Metal Hydroxides" arxiv.org, Cornell University Library, 201 Olin Library Cornell University Ithaca, NY 14853, Nov. 8, 2016 (Nov. 8, 2016), DOI: 10.1039/C6SC05268A, XP080730131, 19 pages.

Guo Minhao et al. NaOH-Intercalated Iron Chalcogenides ($Na_{1-x}$OH)$Fe_{1-y}$ X (X=Se, S): Ion-Exchange Synthesis and Physical Properties, Inorganic Chemistry, Easton . US, vol. 60, No. 12, Jun. 21, 2021 (Jun. 21, 2021), pp. 8742-8753 DOI: 10.1021/acs.inorgchem.1c00713 ISSN: 0020-1669, XP055916716.

Li et al. "Large-scale synthesis of highly uniform $Fe_{1-x}$S nanostructures as a high-rate anode for sodium ion batteries" Nano Energy, vol. 37. Jul. 1, 2017 (Jul. 1, 2017), pp. 81-89, XP002806387.

* cited by examiner

1

IRON SODIUM HYDROXYSULPHIDE COMPOUND, PROCESS FOR PREPARING SUCH A COMPOUND, ACTIVE MATERIAL COMPRISING SUCH A COMPOUND AND ELECTROCHEMICAL ELECTRODE PRODUCED OF SUCH AN ACTIVE MATERIAL

CROSS-REFERENCE TO RELATED APPLICATIONS

The present application is the national stage of international application PCT/FR2022/051771, filed on Sep. 21, 2022, and claims the benefit of the filing date of French Appl. No. 2110363, filed on Sep. 30, 2021.

TECHNICAL FIELD

Energy storage electrochemical systems have important applications in the field of mobile electronics and electric vehicles. One of the most used accumulator technologies is based on the use of lithium ions.

The very broad generalisation of these lithium technologies currently raises numerous questions in terms of cost of lithium as well as of the associated mineral reserves. Indeed, the price of lithiated precursors such as $Li_2CO_3$ has been multiplied by three these last twenty years, and the lithium sources remain geographically very limited. (Slater, M. D., Kim, D., Lee, E., & Johnson, C. S. (2013). Sodium-ion batteries. Advanced Functional Materials, 23 (8), 947-958). For these reasons, many researches are conducted to develop alternative technologies. Among these, sodium ion-based accumulators are of particular interest.

Like for Li-ion batteries, the Na-ion battery uses electrode materials so-called "active material", which should enable the insertion and de-insertion of the sodium ions during the charging and discharge processes. These insertions and de-insertion should be reversible so that the accumulator could store energy over many cycles. A good mobility of the sodium ion in the structure as well as a good electrical conductivity of the electrode material are essential properties allowing using these batteries at high charging and discharge rates, allowing for a high electrical power. The specific power (W/kg) of a battery is a major issue for the automotive application because it allows using lighter batteries for the same effort or it allows using batteries under more secure conditions.

While many negative electrode materials have been listed in the literature for Li-ion batteries (sulphides, oxides, carbon-based materials), very few materials have proven to be a true interest as active materials of negative electrodes for Na-ion batteries. In particular, the family of sulphides and hydroxysulphides have been very little studied. However, the strong valence of the sulphides ensures a good mobility of the sodium ion and a good electron mobility (ensuring a good electrical conductivity). Many transition metal sulphides ($MoS_2$, $TiS_2$) have lamellar structures into lamellae between which the sodium can diffuse rapidly in large amounts, conferring a good capacity on the compound (number of sodium ions or of charges that can be inserted by mass of electrode expressed in mAh). Yet, a sulphide defect is related to the mass of sulphur and to the soft nature (in mechanical terms) of these compounds which considerably deform during the insertion/de-insertion of the sodium, often causing mechanical ageing and a swelling of the batteries. Besides, these compounds are free of sodium and the battery should be made considering metallic sodium or a low-potential compound that already contains sodium.

PRIOR ART

In the prior art, the document Li et al. (Large-scale synthesis of highly uniform Fe1-xS nanostructures as a high-rate anode for sodium ion batteries—Nano Energy—Volume 37, 1 Jul. 2017, Pages 81-89—DOI: 10.1016/j.nanoen.2017.05.012 (Li, L., Peng, S., Bucher, N., Chen, H.-Y., Shen, N., Nagasubramanian, A., Eldho, E., Hartung, S., Ramakrishna, S., Srinivasan, M) which discloses the use of iron sulphide in the anodes of sodium batteries and their large charge capacity, in a particular structure but this product does not initially contain sodium.

DISCLOSURE OF THE INVENTION

An object of the invention is a compound of formula $(NaOH)_x[Fe(OH)_2]_yFeS$ with x and y varying between 0 and 1.

Another object of the invention is a method for preparing a compound of formula $(NaOH)_x[Fe(OH)_2]_yFeS$ with x and y varying between 0 and 1, comprising the following steps:

a. Mixing iron and sodium sulphide in equimolar amounts, in an NaOH aqueous solution, b. Heating the obtained mixture up to a temperature comprised between 110° C. and 210° C. for a duration comprised between 1 hour and one week, c. Recovering the active material by filtering and drying in a neutral atmosphere.

The iron mass content may be 0.56 g and the sodium sulphide mass content may be 2.6 g.

The NaOH aqueous solution may have a concentration ranging from 1 to 10 mol/l, preferably 1 mol/l.

The heating duration may be equal to 4 days.

The heating temperature may be equal to 160° C.

The drying may be carried out for 4 h at 90° C. under a dry nitrogen atmosphere.

Another object of the invention is a negative electrode for a sodium-ion battery comprising at least one active material with the above-described compound.

The active material content may vary from 50% to 97% by weight, preferably 97% by weight, relative to the total weight of the negative electrode.

The negative electrode may further comprise at least one additional conductive compound.

The additional conductive compound may be selected from among metal particles, carbon, and mixtures thereof, preferably carbon.

The carbon may be in the form of graphite, carbon black, carbon fibres, carbon nanowires, carbon nanotubes, carbon nanospheres, preferably carbon black.

The additional conductive compound content may vary from 3% to 50% by weight, preferably from 3% to 20% by weight, relative to the total weight of the negative electrode.

Another object of the invention is a sodium-ion battery comprising at least one negative electrode as described hereinabove.

In particular, the negative electrode for a Na-ion battery has the following advantages:

having a large capacity greater than the material $Na_4Ti_5O_{12}$ at low and high regimes: up to 110 mAh/g for a charging/discharge in 10 h, being made of a material produced by an aqueous synthesis, allowing reducing the synthesis time compared with the prior art, and being made of a material promoting a good reversible mobility of sodium.

BRIEF DESCRIPTION OF THE DRAWINGS

Other aims, features and advantages of the invention will become apparent upon reading the following description, given solely as a non-limiting example and made with reference to the appended drawings wherein.

DETAILED DESCRIPTION

The iron sodium hydroxysulphide compound of formula $(NaOH)_x[Fe(OH)_2]_yFeS$ with x and y varying between 0 and 1 has a lamellar structure alternating iron sulphide FeS lamellae with sodium and/or iron hydroxide lamellae. The compound thus formed is an iono-covalent type one.

A process for preparing an iron sodium hydroxysulphide compound $(NaOH)_x[Fe(OH)_2]_yFeS$ is based on a reaction involving an equimolar mixture of iron and sulphur, in an NaOH aqueous solution. Heating may be necessary to obtain stoichiometric and well crystallised phases.

A first example of the preparation method is as follows: 0.56 g of an Iron powder, 2.6 g of nonahydrate sodium sulphide $Na_2S$, $9H_2O$ are mixed in 30 ml of a sodium hydroxide NaOH solution at a concentration of 1 mol/l. The whole is heated without stirring at 160° C. for 4 days in a closed and pressure-resistant enclosure, in particular in an autoclave. After cooling down to room temperature, the solution comprises a black precipitate. The solution is filtered so as to isolate the precipitate, which is dried afterwards for 4 h at 90° C. under a dry nitrogen atmosphere. After this drying, the precipitate is ground thereby allowing obtaining a fine powder $(NaOH)_x[Fe(OH)_2]_yFeS$ with x=0.5 and y=0.75.

Afterwards, the compound may be used as an active material in an electrode. For example, an electrode made of an active material is prepared by crushing 200 mg of the compound $(NaOH)_x[Fe(OH)_2]_yFeS$ with 50 mg of Timcal® SuperC65 carbon (a 80:20 mixture), used as a conductive additional compound, in an agate mortar. In some particular embodiments, the mixture of the compound (NaOH): [Fe (OH)₂]_yFeS and of carbon may comprise additive allowing preserving cohesion thereof, in particular polymers.

To carry out an electrochemical characterisation of the electrode made of active material by galvanostatic cycling, an electrochemical cell with two electrodes is made in a glovebox using a device (12 mm diameter Swagelok®). In the Swagelok® device, a first layer consisting of 25 mg of the mixture of the active material with carbon, two layers of a separator made of glass microfibres (Whatman®, CAT No. 1823-070) cut to the appropriate diameter imbibed with electrolyte and then a pure sodium sheet (Sigma-Aldrich®) cut in the die and bonded by pressure to a current collector made of stainless steel (Alfa Aesar®), are placed in the Swagelok® device. The used electrolyte is a sodium salt $NaPF_6$ dissolved at a concentration of 1.0 mol/l in an equi-volumetric mixture of ethylcarbonate and diethylcarbonate.

Once mounted, this cell is subjected to electrochemical tests on a BioLogic® cycler, namely a galvanostatic cycling operated at C/10 (charging/discharge in 10 h) between 3V and IV relative to the potential of the Na/Na+ pair.

Figure 1:
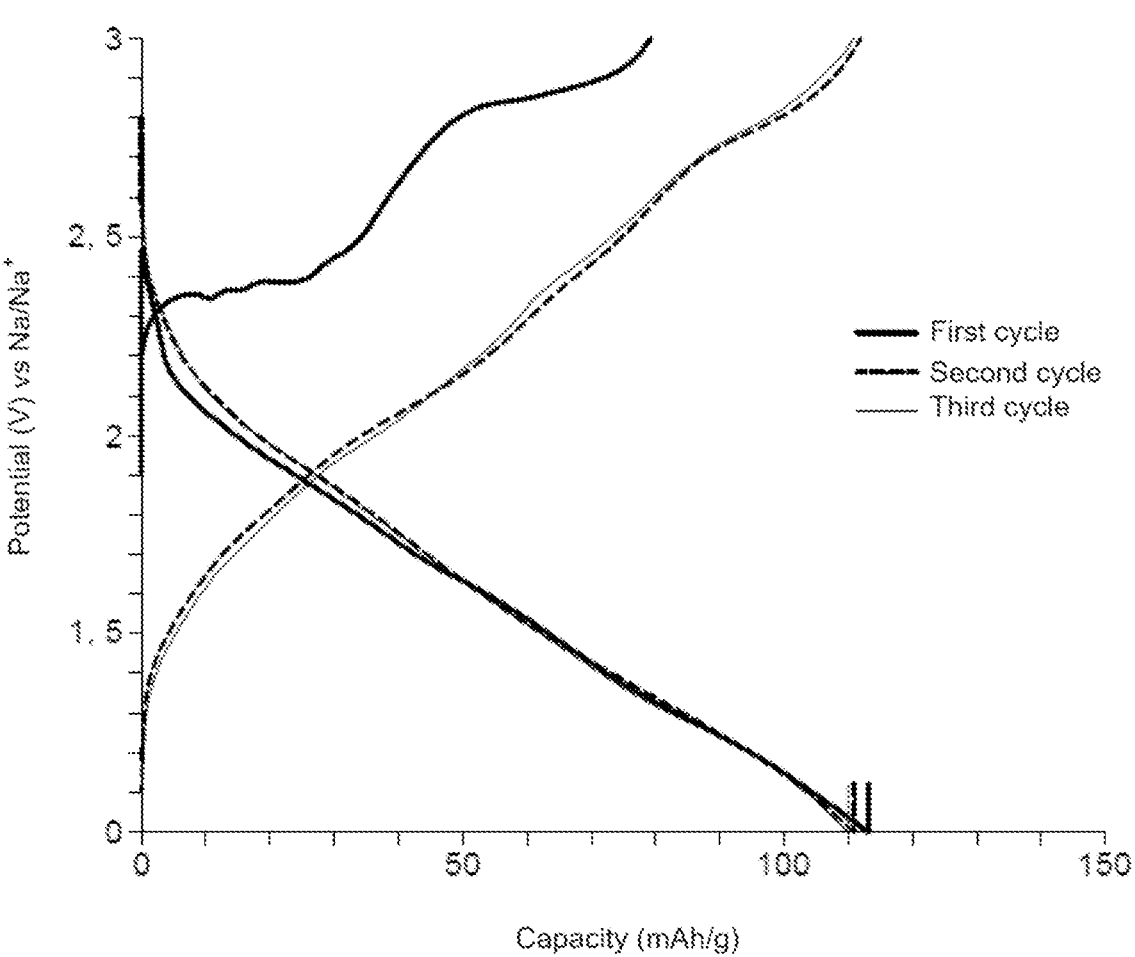
FIG. 1 illustrates the galvanostatic regime behaviour of the compound.

FIG. 1 illustrates the galvanostatic regime behaviour of the compound on an electrochemical half-cell with two electrodes (active material/electrolyte/sodium metal), for charging in 10 h. The first discharge allows irreversibly reaching a capacity of 75 mAh/g with 0.5 Na inserted. The next cycles lead to a reversible capacity of 110 mAh/g with 0.7 Na inserted. The average potential reached during the reversible cycling is 1.8V with respect to the potential of the Na/Na+ pair. Hence, this active material can be used as a negative electrode.

Figure 2:
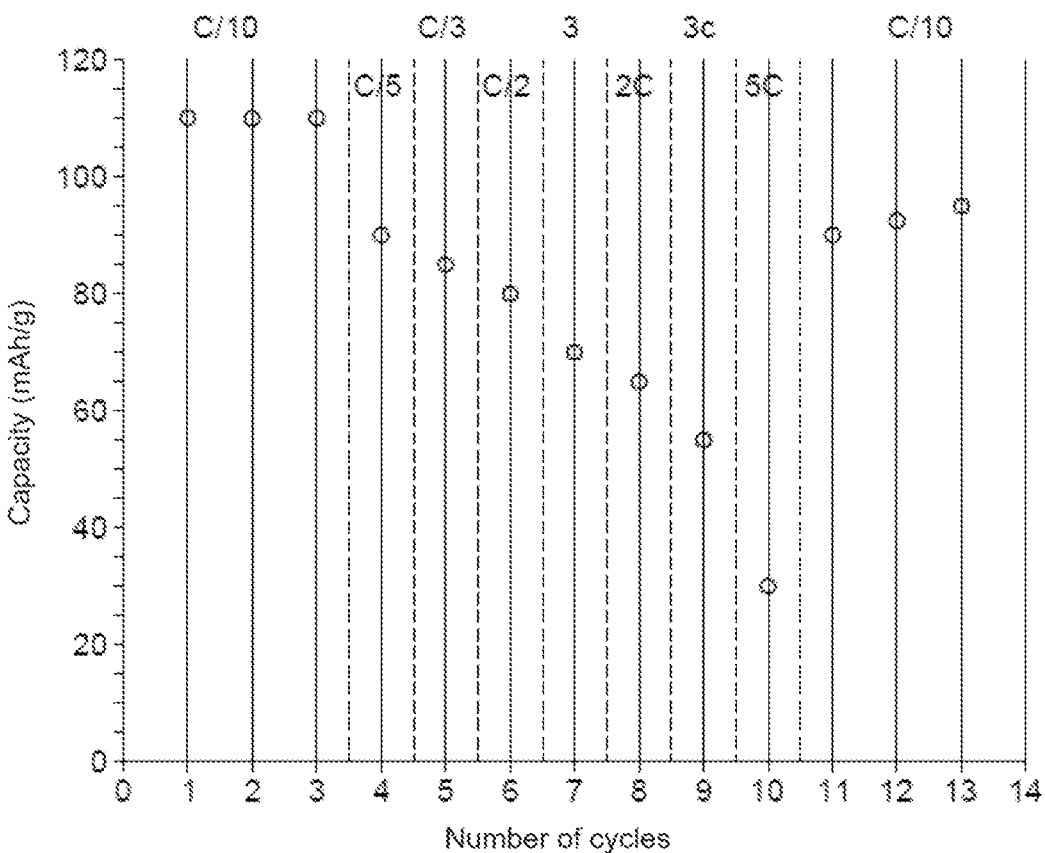
FIG. 2 illustrates the evolution of the capacity of the electrochemical half-cell with two electrodes at different charging regimes.

FIG. 2 illustrates the evolution of the capacity of the electrochemical half-cell with two electrodes at different charging regimes (charging/discharge in 10 h, 5 h, 3 h, 1 h, 2 h and 12 min). In fast charging in 20 min, 50% of the capacity is lost (in comparison with a charging/discharge in 10 h).

A second example of the preparation process differs by the concentration of the sodium hydroxide solution. The second example of the process is as follows: 0.56 g of Iron powder, 2.6 g of nonahydrate sodium sulphide $Na_2S$, $9H_2O$ are mixed in 30 ml of a NaOH solution with a concentration of 3 mol/l. The set is heated without stirring at 160° C. for 4 days in a closed and pressure-resistant enclosure, in particular in an autoclave. After cooling down to room temperature, the solution comprises a black precipitate. The solution is filtered so as to isolate the precipitate, which is dried afterwards for 4 h at 90° C. under a dry nitrogen atmosphere. After this drying, the precipitate is ground thereby allowing obtaining a fine powder (a yield of about 80%) of the compound $(NaOH)_x[Fe(OH)_2]_yFeS$ with x=0.5 and y=0.25.

The compound obtained via the second example of the preparation process is characterised in a manner similar to the characterisation of the compound obtained via the first example of the process.

Figure 3:
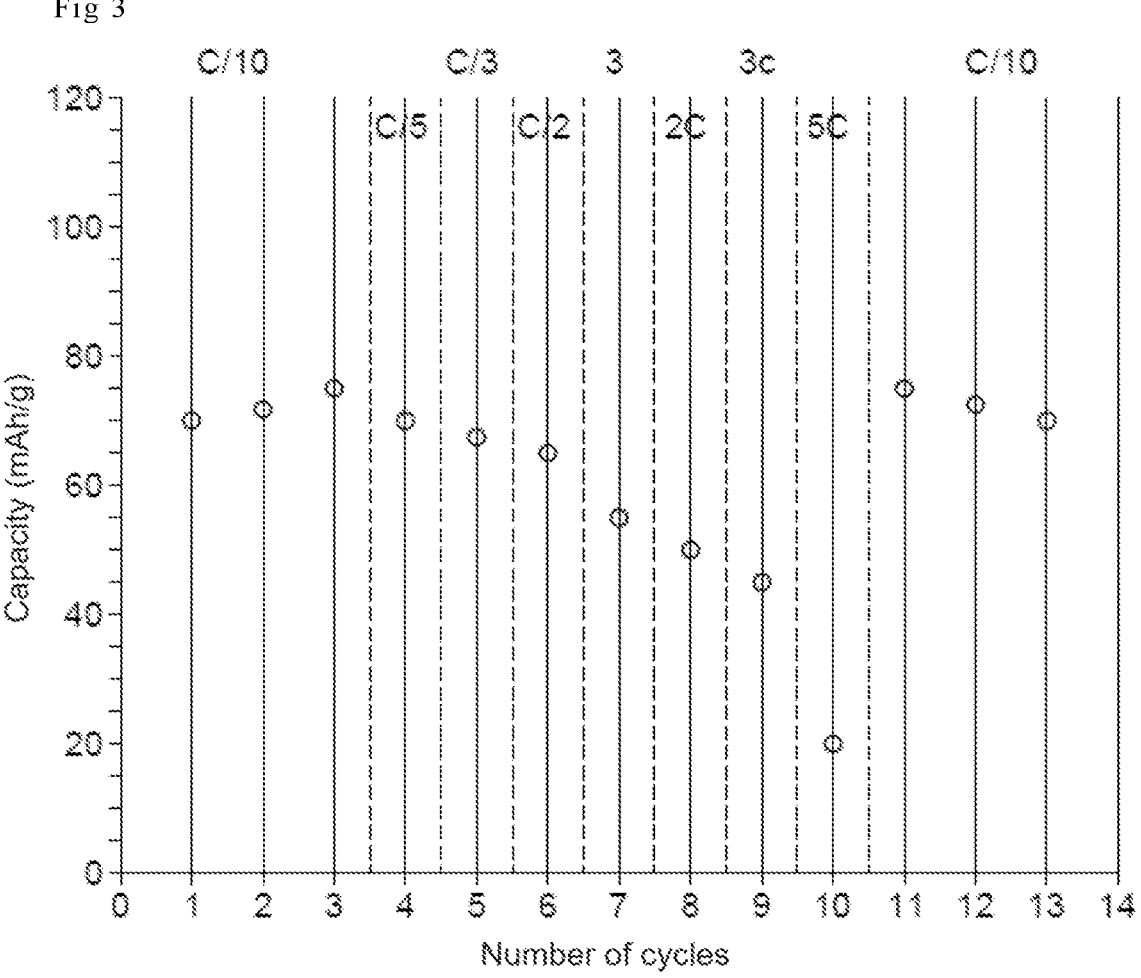
FIG. 3 illustrates the galvanostatic regime behaviour of the compound on an electrochemical half-cell with two electrodes (active material/electrolyte/sodium metal), at different discharge regimes.

FIG. 3 illustrates the galvanostatic regime behaviour of the compound on an electrochemical half-cell with two electrodes (active material/electrolyte/sodium metal), at different discharge regimes. The capacity of the compound is 70 mAh/g at a C/10 regime (charging/discharge in 10 h) and passes into 43 mAh/g for charging in 20 min.

The invention claimed is:

1. A negative electrode configured for a sodium-ion battery, the negative electrode comprising:
   a compound obtained from a process for preparing a compound of formula $(NaOH)_x[Fe(OH)_2]_yFeS$, x and y varying in a range of from 0 excluded to 1, the process comprising:
   (a) mixing iron and sodium sulfide in equimolar amounts, in an NaOH aqueous solution, to obtain a mixture
   (b) heating the mixture up to a temperature in a range of from 110° C. and 210° C. for a duration in a range of from 1 hour to 1 week, to obtain an active material, and
   (c) recovering the active material by filtering and drying in a neutral atmosphere.

2. The negative electrode of claim 1, wherein the active material is present in a range of from 50 to 97% by weight, relative to the total negative electrode weight.

3. The negative electrode of claim 1, further comprising:
   an additional conductive compound.

4. The negative electrode of claim 3, wherein the additional conductive compound comprises a metal particle and/or carbon.

5. The negative electrode of claim 4, comprising the carbon as graphite, carbon black, carbon fibers, carbon nanowires, carbon nanotubes, carbon nanospheres.

6. The negative electrode of claim 4, comprising the carbon as carbon black.

7. The negative electrode of claim 3, comprising the additional conductive compound in a range of from 3 to 50% by weight, preferably from 3% to 20% by weight, relative to the total negative electrode weight.

8. The negative electrode of claim 3, wherein the additional conductive compound comprises carbon.

9. The negative electrode of claim 3, comprising the additional conductive compound in a range of from 3 to 20% by weight, relative to total negative electrode weight.

10. The negative electrode of claim 1, wherein the active material is present in 97% by weight, relative to total negative electrode weight.

11. A sodium ion battery, comprising:
the negative electrode of claim 1.

* * * * *